Jan. 9, 1968 C. C. SCHMIDT 3,362,071
DOUBLE-CUTTING SHEARS
Filed May 25, 1966 2 Sheets-Sheet 1

INVENTOR.
CHARLES C. SCHMIDT
BY
*Robert E Breidenthal*
ATTORNEY

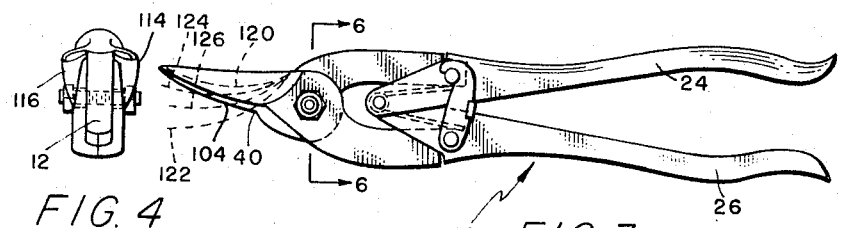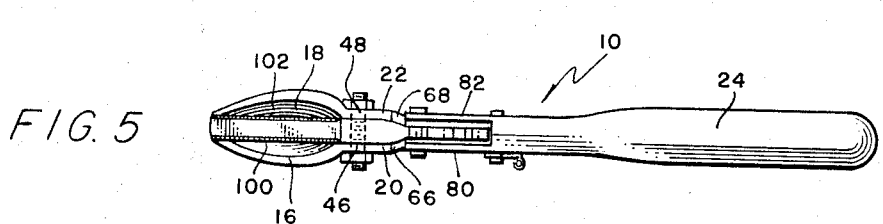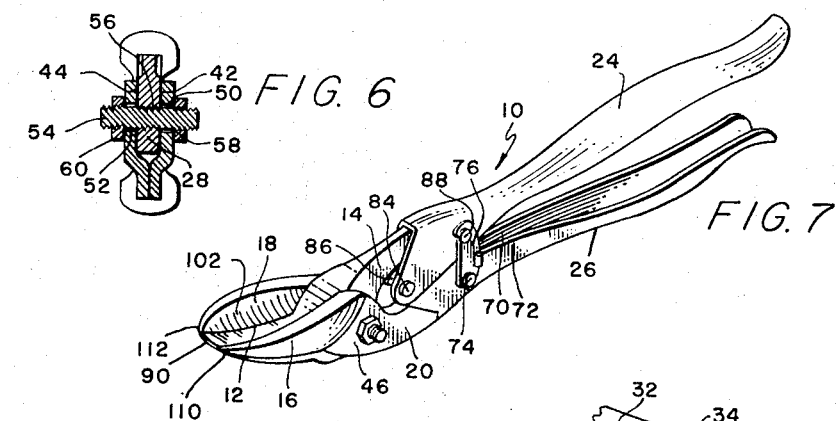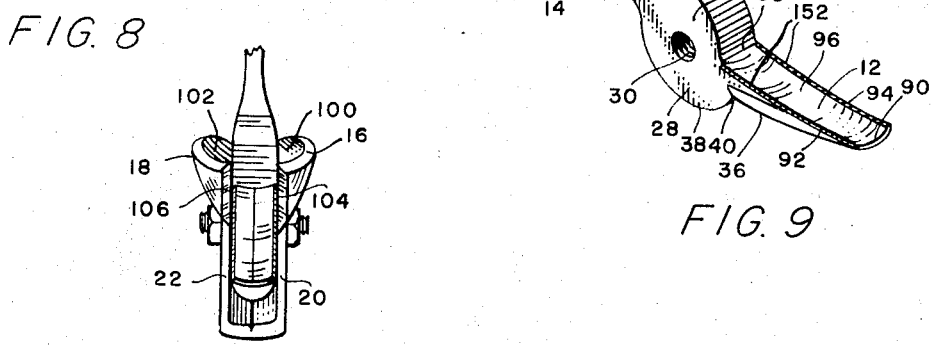

United States Patent Office 3,362,071
Patented Jan. 9, 1968

3,362,071
DOUBLE-CUTTING SHEARS
Charles C. Schmidt, 3126 Arnold,
Topeka, Kans. 66614
Filed May 25, 1966, Ser. No. 552,972
7 Claims. (Cl. 30—258)

The present invention relates to double-cutting shears or cutters, and more particularly pertains to shears or cutters especially well suited to the making of circumferential cuts in conduits and to the cutting of straight, right and left hand curves in flat sheet material with equal facility and substantially without binding.

The principal object of the invention is to provide shears that in the making of a double cut neither requires nor causes substantial flexing or bending of sheet material, whether flat or in conduit form, on either side of the cutting path, and which cutting path can be curved either to the right or the left.

Another important object of the invention is to provide a double-cutting shears in which each of the outer blades can be independently adjusted in its relationship to the central blade.

Yet another object of the invention is to provide double-cutting shears which may optionally be of such character that the central blade thereof can be employed to make and thereby be inserted into an opening transverse to the path of the cutting to be made.

Still another object is to provide double-cutting shears in which the outer blades can be individually replaced if desired, and wherein the outer blades can be disassembled from each other and also from the central blade, whereby shearing edges can be ground or otherwise trued as may become necessary after prolonged hard usage.

The last and very important object to be specifically enumerated is to provide double-cutting shears of the character set forth above in which the relative shearing movement of the central blade and the outer blades is such that the strip of material in the process of being sheared or severed is caused to be pushed upwardly and forwardly in such a manner as to clear all elements of the shears during subsequent forward progress of the shears even when the latter are being turned.

Briefly, the double-cutting shears of this invention comprises a central blade having laterally spaced opposite sides each provided along its upper margin with an upwardly directed shearing edge, a pair of outer blades disposed on opposite sides of the central blade, said outer blades having spaced adjacent sides provided along their lower margins with downwardly directed shearing edges for coacting with the shearing edges of the central blade, means pivotally connecting the central blade about an axis to the outer blades for swinging movement relative thereto between open and closed positions, each of the shearing edges of the central blade having a smoothly curved, upwardly concave first line of projection on a plane that is normal to the axis and intermediate the shearing edges of the central blade, each of the shearing edges of the outer blades having a smoothly curved, upwardly concave second line of projection on said plane, said lines of projection intersecting at an acute angle and at a position that respectively decreases and moves further from the axis as the blades are moved from the open towards the closed position, said opposite sides of the central blade being downwardly convergent to each other and said plane below the shearing edges of the central blade, and said adjacent sides of the outer blades being upwardly divergent from each other and said plane above the shearing edges of said outer blades, whereby a double cut can be made to sever laterally an elongated strip from sheet stock with such strip being caused to curl upwardly above the central blade during its severance, and whereby such strip can be severed from the sheet stock along a curve with the strip severed along a curve being afforded lateral clearance between the adjacent sides of the outer blades by virtue of the upward divergence of the latter, and with lateral clearance being afforded edges of sheet stock previously contiguous to the severed strip by virtue of the downward convergence of the opposite sides of the central cutter.

Another aspect of the invention comprises shears such as specified in the immediately preceding paragraph, wherein the first and second curved lines of projection are each substantially circular arcs and of substantially equal radii having first and second centers respectively, said first center being more remote from the axis than the second center and above the latter when the blades are closed, and wherein the central blade has a top side, said top side of the central blade being transversely concaved between the shearing edges thereof for substantially the entire length of the shearing edges.

Yet another aspect of the invention comprises shears such as specified in the penultimate paragraph, wherein the central blade and the outer blades each progressively taper in vertical thickness towards the ends thereof remote from the axis, and wherein the free end of the central blade terminates in a transversely extending forwardly directed and generally chisel-shaped edge between the shearing edges for piercing a sheet material.

Still another aspect of the invention resides in shears such as specified in the third preceding paragraph, wherein each of the outer blades is provided with an integral actuating arm, said actuating arms extending rearwardly in convergent relationship, with means being provided to join such arms together rearwardly of the axis, said central blade also being provided with a rearwardly and upwardly extending integral actuating arm that is disposed between and extends rearwardly to overlie the first mentioned convergent arms, said central and outer blades being provided aligned openings therethrough concentric with said axis, with the opening through the central blade being internally threaded, a pivot pin extending through all said openings, said pivot pin being externally threaded intermediate its ends and having threaded engagement with the internally threaded opening through the central blade, said pin having threaded end portions projecting outwardly from the openings through the outer blades, said pin including cylindrical portions slidable in the openings in the outer blades, and nuts threaded on the end portions, each of such nuts engaging one of the outer blades and adjustably urging the shearing edge thereof toward the central blade.

A very important feature of the invention resides in the adjacent sides of the outer blades being upwardly divergent from the shearing edges thereof, and in the opposite sides of the central blade being downwardly convergent from the shearing edges thereof. The arrangement is such that as soon as the severed strip is pressed upwardly upon shearing, the severed strip moves into a region affording lateral clearance for each of its lateral edges, and so that the material severed from the opposite sides of the strip is caused to move relative to the shears in such a manner that clearance is afforded between the edges and the opposite sides of the central blade.

Another feature of the invention of importance resides in the top of the central blade being concaved intermediate the shearing edges of such central blade, whereby lateral edges of the severed strip are prevented from binding against the top surface of the central blade when cutting a curved path.

Still another important feature of the invention resides in the central blade tapering in vertical thickness in a forwardly direction and terminating in a chisel-like forward edge such that the same can be used to form an opening in a material to be operated upon by the shears that is transverse to the direction of the path of cutting and which extends between the shearing edges of the central blade.

Yet another feature of the invention resides in the outer blades being separate, and individually adjustable towards and away from the central blade by means of a pivot pin secured in the central blade against longitudinal movement, such pivot pin being provided with threads and a nut for urging such adjustment.

These and other objects, aspects, features and advantages will become clearly manifest during the ensuing description of a preferred embodiment of the invention, such description to be taken in conjunction with the accompanying drawings illustrative of such embodiment of the invention, wherein:

FIGURE 3 is a side elevational view of the double-cutting shears, the same being shown in closed position and latched against opening, this view showing the spring means in dashed outline; and illustrating in dashed outline a plurality of relative positions occupied by the shearing edges of the central blade being opened to various extents;

FIGURE 4 is a front elevational view of the shears shown in FIGURE 3;

FIGURE 5 is a top elevational view of the shears shown in FIGURE 3;

FIGURE 6 is a vertical transverse sectional view taken upon the plane of the section line 6—6 in FIGURE 3;

FIGURE 7 is an isometric view of the shears shown in FIGURE 3;

FIGURE 8 is a fragmentary front elevational view of the shears, this view showing the shears in open position; and, FIGURE 9 is an enlarged fragmentary isometric view of the central blade and a portion of its actuating arm.

Figure 1:
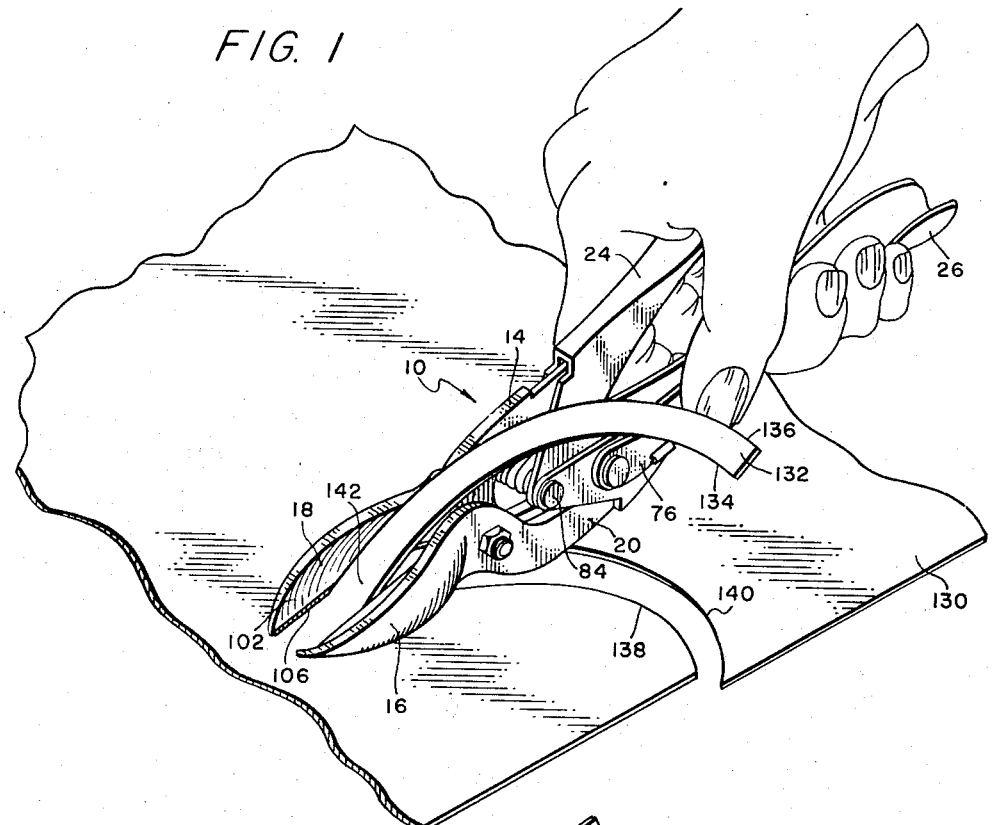
FIGURE 1 is an isometric view illustrating the double-cutting shears in use cutting a curved path in flat sheet material.

Referring now to the drawings, wherein like numerals designate like parts throughout the various views, the reference numeral 10 designates the double-cutting shears of this invention generally. The shears 10 comprise a central blade 12 having an integral actuating arm 14, left and right outer cutters 16 and 18 each respectively provided with integral actuating arms 20 and 22, and upper and lower handles 24 and 26 respectively.

As best shown in FIGURE 9, the region of the juncture 28 of the central blade 12 and the actuating arm 14 thereof is enlarged and provided with an internally threaded opening 30 therethrough, in the relationship of the central blade 12 and the actuating arm 14 to the juncture region 28 is such that the actuating arm 14 extends upwardly and rearwardly from the central blade 12; more accurately, the longitudinal extents of the central blade 12 and the actuating arm 14 are generally parallel to each other with the actuating arm 14 being upwardly offset from the central blade 12 at the region of the juncture 28. The top 32 of the actuating arm 14 merges or fairs smoothly with the top 34 of the juncture region 28 as shown, and the bottom 36 of the central blade 12 has a longitudinal extent disposed generally in such a manner that a rearward projection thereof is substantially tangential to the bottom 38 of the juncture region 28 (see also FIGURE 3 in this regard). The bottom edge 36 of the central blade 12 may smoothly merge with or be faired into the bottom edge 38 of the juncture region 28, or if desired a small indentation such as indicated at 40 may be defined at the junction of the lower edge 36 with the lower edge 38 as shown in the drawings. It is strongly preferred, in accordance with the illustrated embodiment of the invention, that the bottom edge 38 of the juncture region 28 be above, at or only slightly displaced downwardly below a rearward projection of the bottom edge 36 of the central blade 12.

The opposite sides 42 and 44 of the juncture region 28 are about the periphery of the threaded opening 30 parallel to each other, and juncture regions 46 and 48, defined respectively at the juncture of the outer blade 16 with its actuating arm 20 and at the juncture of the outer blade 18 with its actuating arm 22, are disposed against or in closely spaced proximity to such opposite sides 42 and 44 of the juncture region 28. The juncture regions 46 and 48 are respectively provided with cylindrical openings 50 and 52 therethrough that are in axial alignment with the threaded opening 30 in the juncture region 28 of the central blade 12. A pivot pin 54 (see FIGURE 6) extends through the aligned openings 30, 50 and 52, and an intermediate or central portion of the longitudinal extent of the pivot pin 54 is threaded as indicated at 56, and such intermediate threaded portion 56 is in threaded engagement with the threaded opening 30 in the juncture region 28, the arrangement being such that the pin 54 is restrained against longitudinal movement except on the turning or screwing of the same in the opening 30. Nuts 58 and 60 are threaded upon the opposite extremities of the pivot pin 54, such nuts bearing against the remote outer sides of the juncture regions 46 and 48, whereby each of such junctures 46 and 48 can be adjustably and independently urged or moved toward the juncture region 28. The openings 50 and 52 are of sufficient diameter that the portions of the pivot pin extending therethrough do not interfere with the described adjustment obtained by use of the nuts 58 and 60. In the preferred construction, the portions of the pivot pin 54 extending through the openings 50 and 52 are unthreaded and have diameters such as to constitute a bearing fit within the openings 50 and 52, such diameters being essentially the same as the overall diameter of the threaded end portions of the pivot pin 54 on which the nuts 58 and 60 are disposed. In the preferred construction, the nuts 58 and 60 are of the self-locking type so that the nuts will not turn upon the pivot pin 54 inadvertently. Since in the desired operation of the device it is not desired that the pivot pin 54 turn relative to the central blade 12 or the juncture region 28, the adjacent sides of the nuts slidingly seat against the junctures 46 and 48, and if desired washers, not shown, or any other suitable antifriction means can be interposed between the nuts and the junctures 46 and 48 so that turning of the outer blades 16 and 18 about the pivot pin 54 relative to the central blade 12 will not result in the pivot pin 54 being turned relative to the central blade 12 or the juncture region 28, as will be evident to those skilled in the art.

As best shown in FIGURE 5, the actuating arms 20 and 22 of the outer blades 16 and 18 extend rearwardly of the juncture region 28 and thence converge rearwardly as indicated at 66 and 68 into abutment with each other. The rear end and abutting portions of the actuating arms 20 and 22 are received within the confines of the forward end of the lower handle 26, the latter being generally channel- or U-shaped in transverse cross section to include side portions or flanges 70 and 72, the abutting rear end portions of the actuating arms 20 and 22 being received between the flanges 70 and 72. The abutting rear end portions of the actuating arms 20 and 22 are pivotally connected to the handle 26 by means of a pivot pin 74 extending through aligned openings through the actuating arms 20 and 22 and the flanges 70 and 72. For a purpose to be presently explained, a hook 76 is also pivotally mounted on the pivot pin 74 on the outside of the flange 72. The pivot pin 74 can be in the simple form of a rivet having enlarged ends so as to prevent disassembly; however, it is preferred that the pivot pin 74 be in the form of a nut and bolt, whereby the structure can be more easily disassembled for replacement or repair of parts as may ultimately become necessary after long and hard usage of the tool or shears 10.

The upper handle 24 is also of channel- or U-shape configuration and includes side flanges 80 and 82. The side flanges 70 and 72 of the lower handle 26 and the side flanges 80 and 82 of the upper handle 24 project forwardly and overlap as clearly shown in FIGURES 3 and 7, and such overlapping portions of the side flanges have aligned openings therethrough, and a pivot pin 84 extends through such aligned openings to afford a pivotal connection between the forward ends of the handles 24 and 26. The pivot pin 84 can have upset opposite ends to retain the same in assembled relation in a rivet-like fashion. Intermediate the side flanges of the upper and lower handles the pivot pin 84 has wound thereabout the coiled intermediate section of a spring 86, such spring 86 having free ends received within the handles 24 and 26 urging the handles apart in a conventional manner about the pivot pin 84 as an axis.

The rear extremity of the actuating arm 14 of the central blade 12 is received within the forward end of the handle 24, and is pivotally attached thereto by means of a pivot 88 extending through aligned openings in the actuating arm 14 and the side flanges 80 and 82 of the upper handle 24. The pivot pin 88 can be generally similar to the previously described pivot means 74 and is additionally provided with an extension about which the hook 76 can be engaged as shown in FIGURES 3 and 7 to retain the handles from spreading apart when the shears are in the closed position shown in such figures. As thus far described, the hook 76 can be released from the pivot pin 88, whereupon the handles 24 and 26 are resiliently urged apart by the spring 86, such opening movement of the handles 24 and 26 about the hinge or pivot 84 results in the pivot pins 74 and 88 being urged apart with the result of the central blade 12 being swung downwardly relative to the outer blades 16 and 18 about the pivot pin 54 so that the blades move from their closed position towards their open position. Clearly, the blades can be returned or moved toward their closed positions with substantially mechanical advantage upon the user of the shears 10 manually gripping the handles 24 and 26 to urge the latter into their closed positions against the resilience of the spring 86 and the mechanical resistance offered to such material as may be engaged by the blades 12, 16 and 18. The alternate allowing of the handles 24 and 26 to open and manually closing the same may be continued as long as desired and when the need for the use of the tool 10 has been satisfied the handles 24 and 26 can be moved into closed position and held in such closed position by returning the hook 76 to the position shown thereof in FIGURES 3 and 7.

As clearly shown in FIGURE 9, the central blade 12 progressively diminishes in vertical thickness from its juncture with the juncture region 28 to the free end 90 thereof, and in the preferred construction the free end 90 of the central blade 12 is formed as a chisel tip that extends the entire interval between the shearing edges 92 and 94, such shearing edges 92 and 94 being defined along the opposite top edges of the blade 12 and their juncture with the upper surface 96 of the blade 12. As will be explained presently, forming the end 90 of the blade 12 as a transversely extending chisel tip enables the user of the tool to force the blade to penetrate a sheet material and to form a cut therein that is transverse to the path of cutting to be performed.

Additionally, not only does the blade 12 taper in vertical thickness towards its free end 90, the blade 12 has the opposite sides thereof tapered downwardly below the shearing edges 92 and 94 in such a manner that the greatest breadth of the blade 12 is along and immediately adjacent the shearing edges 92 and 94 and is of progressively diminishing transverse thickness below such shearing edges for a purpose to be presently explained. Also for a purpose to be presently explained, the upper surface 96 of the blade 12 is preferably concaved along the extent of the upper surface intermediate the shearing edges 92 and 94.

The shearing edges 92 and 94 are arcuate along their longitudinal extents in such a manner that projections thereof on a medial plane normal to the axis of the opening 30 constitutes a curved line of projection that is concave upwardly; such curved line of projection being approximately a circular arc. Additionally, the longitudinal curvature of the upper surface 96 as well as the longitudinal curvature of the shearing edges 92 and 94 are such as to smoothly merge or fair into the top surface 34 of the juncture region 28 as indicated at 98.

From the foregoing, it will be seen that the central blade 12 is symmetrical about a medial plane normal to the opening 30, has parallel (constant transverse spacing) shearing edges 92 and 94, has an upper surface that is transversely concaved, has opposite sides that converge downwardly, has arcuate shearing edges that are concaved upwardly, and which is of tapering vertical thickness forwardly to terminate in a chisel edge or end.

The outer blades 16 and 18 are symmetrical to each other with respect to the medial plane of the central blade, and respectively include adjacent sides 100 and 102 with the lower edges of the adjacent sides 100 and 102 respectively defining shearing edges 104 and 106, such shearing edges 104 and 106 respectively cooperating with the shearing edges 94 and 92 of the central blade 12. As clearly shown in the drawings, particularly FIGURES 5 and 7, the adjacent sides 100 and 102 of the outer blades 16 and 18 are upwardly divergent from each other and the medial plane of the central blade 12, and each of such sides is concave, the arrangement generally being such that an overall generally concave configuration is established by the longitudinal and transverse curvature of the upper surface 96 of the blade 12 and the fairing region 98 of the latter with the top 34 of the juncture region 28, taken in conjunction with the concave adjacent sides 100 and 102 of the outer blades 16 and 18.

The total vertical height of the blades 16 and 18 progressively tapers to the free ends 110 and 112, such ends preferably being, though not necessarily so, rather pointed and spaced at least no further from and preferably spaced a somewhat lesser distance from the axis of the pivot pin 54 than is the chisel end 90 of the central blade 12. In addition, as will be clearly apparent on inspection of the drawings, the outer remote side surfaces 114 and 116 of the blades 16 and 18 are upwardly divergent from the shearing edges 104 and 106 thereof.

In a manner similar to that previously set forth in connection with the shearing edges 92 and 94 of the central blade 12, the shearing edges 104 and 106 are parallel (equally spaced transversely from each other), and are arcuate in such a manner that projections thereof on a medial plane define a curved line of projection that is concave upwardly, and in the preferred construction such curved line of projection is substantially a circular arc of approximately the same radius as that defined by the previously described line of projection of the shearing edges 92 and 94. It is highly preferred, and it is believed quite important to the practice of the invention that the relationship of the central blade 12 to the outer blades 16 and 18 be such that, when the blades are closed as shown in FIGURES 3, 5 and 7, the center or more accurately the axis of curvature of the shearing edges 92 and 94 of the center blade 12 be disposed above and forwardly of the corresponding center or axis of curvature of the shearing edges 104 and 106 of the outer blades 16 and 18.

The latter mentioned arrangement results in various relationships between the shearing edges involved that are realized for various degrees of opening of the blades such as indicated in dashed outline in FIGURE 3. With specific reference to FIGURE 3, the position of the shearing edges 92 and 94 corresponding to closure of the blades is indicated by the curved dashed line 120. Similarly, the curved dashed line 122 indicates the relative position of the shearing edges 92 and 94 when the blades are opened with the curved dashed lines indicated at 124 and 126 indicating relative intermediate positions of such shearing edges. From inspection of the dashed lines 120 through 126, it will be seen that during closure of the blades the relative movement of the shearing edge portions immediately juxtaposed to each other that are effective in the shearing operation is such that the upward closing movement of the blade 14 tends to cause and urge not only upward but additionally a distinct movement to the strip of material directly overlying and being sheared by the blade 12.

Figure 2:
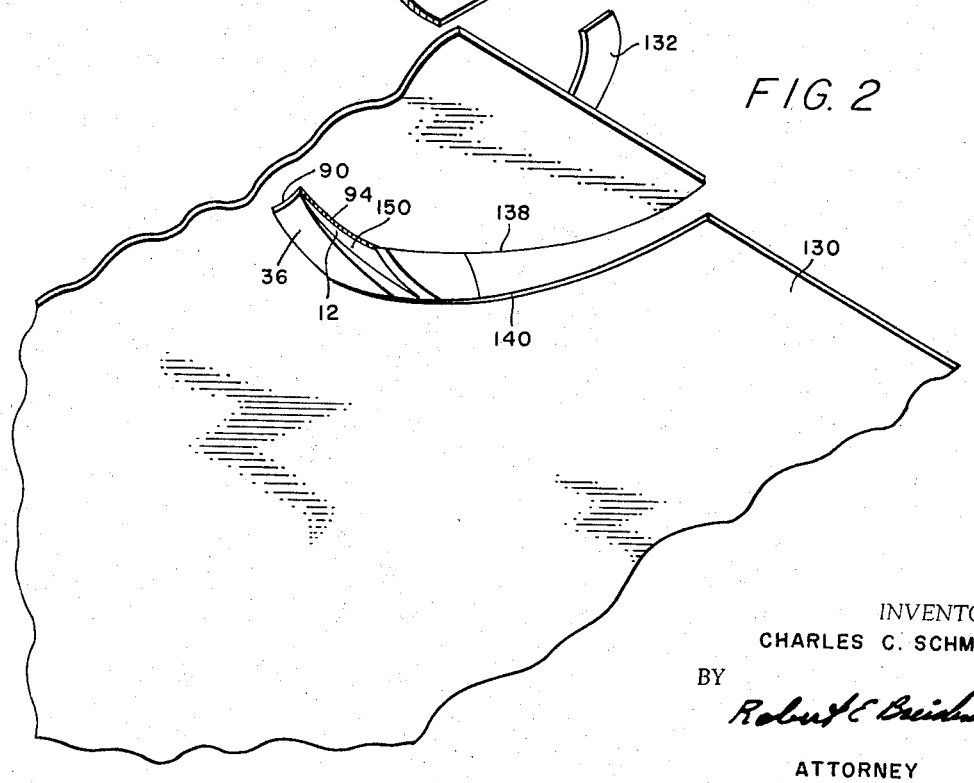
FIGURE 2 is an isometric view from the underside of the showing in FIGURE 1.

Such form of shearing action is best appreciated upon considering FIGURES 1 and 2, such figures showing the shears 10 in the process of cutting a curved path in a flat sheet of material 130, and showing the shears in such a position approximating the shearing edge relationship depicted by the curved dashed line 126 in FIGURE 3.

Such shearing or cutting use of the tool 10 depicted in FIGURES 1 and 2 shows a strip of material 132 being severed from the sheet of material 130, such strip of material 132 having opposite side edges 134 and 136 that correspond to edges 138 and 140 formed in the sheet of material 130 along the opposite sides of the cut.

It will be noted on considering FIGURE 1 that the cut being made is curved to the left and that the strip 132 is being urged forwardly and upwardly as described previously along the advancing line of severance indicated at 142. It is of particular importance to observe that during the closure of the jaws accompanied by a turning movement necessary to accomplish the curved cut that the lateral edges 134 and 136 are displaced upwardly between the adjacent sides 100 and 102 of the outer blades 16 and 18 into positions such that clearance is provided for such strip of material 132. Such clearance of the strip 132 is the result of the upwardly diverging and concaved character of the adjacent sides of the outer blades 16 and 18, and binding or hindrance of tool operation by the strip 132 is further reduced by the smooth fairing of the upper surface 96 of the blade 12 into the top 34 of the juncture region 28. It is also believed that a transverse concave character of the top surface 96 of the central blade 12 further contributes to the strip of material 132 being curved upwardly and somewhat into the form of a spiral during the making of a curved cut so as to minimize any tendency to either binding or causing interference to freedom of the movement of the user's hands or of other parts of the shears 10.

In the preferred construction, the outer blades 16 and 18 are of progressively diminishing transverse thickness from the top to the bottom edges thereof, and this coupled with the upper divergence of the remote sides of the outer blades results in only very little flexure of the sheet of material during closure of the blades.

Obviously, as soon as a closure of the blades has been effected, the blades are allowed to reopen by action of the spring 86 on the user relaxing the grip of his hand, and with the blades thus opened the shears can be advanced so as to re-engage shearing edges of the shears with the sheet of material 130 for further advance of the cut on closure of the blades, it being noted that by reason of the strip of material 132 being forced upwardly and forwardly at the point of severance, very little likelihood exists in the normal usage of the tool for the strip of material 132 to interfere with such advance of the shears 10 to a new cutting position.

It will be evident to those skilled in the art that the preceding comments relating to the clearance afforded for the strip 132 are equally applicable whether the tool 10 is being applied to make a cut curving to the left, curving to the right, or a straight cut.

Not only is an extraordinary freedom of interference realized in the use of the tool 10 with respect to portions thereof disposed above the sheet of material 130, but equally as important, the use of the tool 10 entails a corresponding degree of lack of interference between the portions of the tool disposed below the sheet of material, namely, the center blade 12. Such lack of interference or binding action of the blade 12 below the sheet of material 130 is the result primarily of the opposite lateral sides of the blade 12 being downwardly tapered, such downward taper or convergence of the opposite sides 150 of the blade 12 enables clearance of the edges 138 and 140 from the opposite sides 150 of the blade 12 during the cutting of a curved path. For example, on inspection of FIGURE 2, it will be evident that the edge 140 is enabled to pass under the blade 12 without binding against the sides of the center cutting blade 12.

The shears or tool 10 is made of steel such as is conventionally used in model cutting shears, and is useful for making circumferential cuts in circular ducts and for making curved cuts or straight cuts in flat sheet metal. In the preferred construction, the shearing edges 92 and 94 of the central blade are serrated as indicated at 152, as is conventional, in order to assure progressive cutting on closure of the blades. Similarly, the shearing edges 104 and 106 of the outer blades are also serrated for the same purpose.

The chisel edge or tip formed at 90 on the central blade 12 enables ready initiation of a cut in either sheet metal conduit or at a position spaced from edges of flat sheet metal stock, it being appreciated that such chisel point 90 can be driven through the material to be cut so as to initiate a cut along a line perpendicular to the travel path of the cut.

As mentioned previously, the nuts 58 and 60 enable individual adjustment of the outer blades 16 and 18 towards the central blade 12, and the outer blades 16 and 18 along with their integral actuating arms can be readily disassembled from the central blade, whereby replacement or repair can be readily made.

In view of the detailed illustrations of the preferred embodiment of the invention and the preceding detailed description thereof, a full and complete appreciation of the invention will be had by those familiar with the art. It is to be emphasized that the foregoing description has been particularly detailed to convey such a comprehensive understanding of the invention, and narrowness in scope of the invention is not to be thereby inferred. On the contrary, it will be abundantly clear that the illustrated and described preferred embodiment of the invention is susceptible to numerous variations in detail without departing from the spirit of the invention. Accordingly, attention is directed to the appended claims in order to ascertain the actual scope of the invention.

I claim:

1. Double-cutting shears comprising a central blade having laterally spaced opposite sides each provided along its upper margin with an upwardly directed shearing edge, a pair of outer blades disposed on opposite sides of the central blade, said outer blades having spaced adjacent sides provided along their lower margins with downwardly directed shearing edges for coacting with the shearing edges of the central blade, means pivotally connecting the central blade about an axis to the outer blades for swinging movement relative thereto between open and closed positions, each of the shearing edges of the central blade having a smoothly curved, upwardly concave first line of projection on a plane that is normal to the axis and intermediate the shearing edges of the central blade, each of the shearing edges of the outer blades having a smoothly curved, upwardly concave second line of projection on said plane, said lines of projection intersecting at an acute angle and at a position that respectively decreases and moves further from the axis as the blades are moved from the open towards the closed position, said opposite sides of the central blade being downwardly convergent to each other and said plane below the shearing edges of the central blade, and said adjacent sides of the outer blades being upwardly divergent from each other and said plane above the shearing edges of said outer blades, whereby a double cut can be made to sever laterally an elongated strip from sheet stock with such strip being caused to curl upwardly above the central blade during its severance, and whereby such strip can be severed from the sheet stock along a curve with the strip severed along a curve being afforded lateral clearance between the adjacent sides of the outer blades by virtue of the upward divergence of the latter, and with lateral clearance being afforded edges of sheet stock previously contiguous to the severed strip by virtue of the downward convergence of the opposite sides of the central cutter.

2. The combination of claim 1, wherein the first and second curved lines of projection are each substantially circular arcs and of substantially equal radii having first and second centers respectviely, said first center being more remote from the axis than the second center and above the latter when the blades are closed.

3. The combination of claim 1, wherein the central blade has a top side, said top side of the central blade being transversely concaved between the shearing edges thereof for substantially the entire length of the shearing edges.

4. The combination of claim 1, wherein the first and second curved lines of projection are each substantially circular arcs and of substantially equal radii having first and second centers respectively, said first center being more remote from the axis than the second center and above the latter when the blades are closed, and wherein the central blade has a top side, said top side of the central blade being transversely concaved between the shearing edges thereof for substantially the entire length of the shearing edges.

5. The combination of claim 1, wherein the central blade and the outer blades each progressively taper in vertical thickness towards the ends thereof remote from the axis, and wherein the free end of the central blade terminates in a transversely extending forwardly directed and generally chisel-shaped horizontal edge between the shearing edges for piercing a sheet material.

6. The combination of claim 1, wherein each of the outer blades is provided with an integral actuating arm, said actuating arms extending rearwardly in convergent relationship, with means being provided to join such arms together rearwardly of the axis, said central blade also being provided with a rearwardly and upwardly extending integral actuating arm that is disposed between and extends rearwardly to overlie the first mentioned convergent arms, said central and outer blades being provided aligned openings therethrough concentric with said axis, with the opening through the central blade being internally threaded, a pivot pin extending through all said openings, said pivot pin being externally threaded intermediate its ends and having threaded engagement with the internally threaded opening through the central blade, said pin having threaded end portions projecting outwardly from the openings through the outer blades, said pin including cylindrical portions slidable in the openings in the outer blades, and nuts threaded on the end portions, each of such nuts engaging one of the outer blades and adjustably urging the shearing edge thereof toward the central blade.

7. The combination of claim 6, wherein at least some of the shearing edges are serrated, a pair of handles that are pivotally connected at their forward ends, with such pivotally connected forward ends being disposed between the actuating arms of the outer blades and the actuating arm of the central blade, pivot means connecting the rear and free end of the actuating arm of the central blade to one of the handles at a position intermediate the ends of the latter, and said means connecting the converging actuating arms being pivotally connected to the other handle at a position intermediate the ends of the latter.

References Cited
UNITED STATES PATENTS

| | | | |
|---|---|---|---|
| 2,093,987 | 9/1937 | Wallace | 30—258 |
| 2,163,088 | 6/1939 | Grant | 30—258 |
| 2,469,036 | 5/1949 | Hart | 30—258 X |

WILLIAM FELDMAN, *Primary Examiner.*

J. C. PETERS, *Assistant Examiner.*